United States Patent
Dai

(10) Patent No.: US 9,745,114 B2
(45) Date of Patent: Aug. 29, 2017

(54) MEDICINE BOTTLE WITH SOLID SILICA FLAKY DRYING AGENT

(71) Applicant: SHANGHAI YINGQI DESICCANT CO., LTD., Shanghai (CN)

(72) Inventor: Xinhua Dai, Shanghai (CN)

(73) Assignee: Shanghai Yingqu Desiccant Co., Ltd., Shanghai (CN)

( * ) Notice: Subject to any disclaimer, the term of this patent is extended or adjusted under 35 U.S.C. 154(b) by 71 days.

(21) Appl. No.: 14/236,948

(22) PCT Filed: Apr. 1, 2013

(86) PCT No.: PCT/CN2013/073556
§ 371 (c)(1),
(2) Date: Feb. 4, 2014

(87) PCT Pub. No.: WO2013/159634
PCT Pub. Date: Oct. 31, 2013

(65) Prior Publication Data
US 2014/0209488 A1     Jul. 31, 2014

(30) Foreign Application Priority Data

Apr. 24, 2012   (CN) .................. 2012 2 0177028 U

(51) Int. Cl.
*B65D 81/26* (2006.01)
*B65D 51/30* (2006.01)
*A61J 1/03* (2006.01)

(52) U.S. Cl.
CPC .............. *B65D 81/264* (2013.01); *A61J 1/03* (2013.01); *B65D 51/30* (2013.01); *B65D 81/268* (2013.01); *Y02W 90/11* (2015.05)

(58) Field of Classification Search
CPC .... B65D 81/264; B65D 51/30; B65D 81/268; B65D 81/266; B65D 81/267; A61J 1/03
(Continued)

(56) References Cited

U.S. PATENT DOCUMENTS 2,596,763 A * 5/1952 Crowley ............... A47G 19/24
                                          222/190
2,994,404 A * 8/1961 Schifferly ............ B01D 53/261
                                           206/0.5
(Continued)

FOREIGN PATENT DOCUMENTS

CN     201008649     1/2008
CN     101376095     3/2009
(Continued)

OTHER PUBLICATIONS

International Search Report issued in parent, PCT/CN2013/073556, on Jul. 11, 2013 (4 pages).

*Primary Examiner* — Jacob K Ackun
*Assistant Examiner* — Jenine Pagan
(74) *Attorney, Agent, or Firm* — Ware, Fressola, Maguire & Barber LLP

(57) ABSTRACT

A medicine bottle with a solid silica flaky drying agent is disclosed. The solid silica flaky drying agent is wrapped in a filter paper and packed inside a bubble cap on which a number of holes are provided for moisture absorption. The bubble cap containing the solid silica flake drying agent can be attached to the cap of the medicine bottle via a baseplate behind a circular locking notch for preventing the solid silica flake drying agent from falling off the cap, or placed at the bottom of the medicine bottle which has a circular locking notch to prevent the solid silica flake drying agent from falling out of the medicine bottle.

10 Claims, 4 Drawing Sheets

(58) Field of Classification Search
USPC .................................. 206/204, 528, 530, 540
See application file for complete search history.

(56) References Cited

U.S. PATENT DOCUMENTS

| | | | | |
|---|---|---|---|---|
| 3,135,566 | A * | 6/1964 | Frank | G07D 9/004 |
| | | | | 206/0.82 |
| 3,567,085 | A * | 3/1971 | Flores | B65D 81/266 |
| | | | | 206/204 |
| 4,805,789 | A * | 2/1989 | Lancesseur | B65D 81/3205 |
| | | | | 206/221 |
| 5,114,003 | A * | 5/1992 | Jackisch | B65D 81/268 |
| | | | | 206/204 |
| 5,186,775 | A | 2/1993 | Cullen et al. | |
| 5,788,064 | A * | 8/1998 | Sacherer | A61B 10/0096 |
| | | | | 206/204 |
| 5,960,956 | A * | 10/1999 | Langanki | A01N 1/02 |
| | | | | 206/364 |
| 6,571,942 | B2 * | 6/2003 | Riemenschneider | B65D 81/266 |
| | | | | 206/204 |
| 6,986,807 | B2 | 1/2006 | Brunk | |
| 7,300,500 | B2 * | 11/2007 | Okada | B01D 53/02 |
| | | | | 206/204 |
| 7,413,083 | B2 * | 8/2008 | Belfance | B65D 43/162 |
| | | | | 206/204 |
| 2005/0263430 | A1 * | 12/2005 | Giovanni | B65D 21/0228 |
| | | | | 206/528 |
| 2007/0289932 | A1 * | 12/2007 | Kim | B65D 23/12 |
| | | | | 215/6 |
| 2013/0334074 | A1 * | 12/2013 | Wada | B65D 81/26 |
| | | | | 206/204 |

FOREIGN PATENT DOCUMENTS

| | | |
|---|---|---|
| CN | 201375665 | 1/2010 |
| CN | 201847913 | 6/2011 |
| CN | 202802161 | 3/2013 |
| EP | 1254848 | 11/2002 |
| JP | 56031439 A * | 3/1981 |

* cited by examiner

MEDICINE BOTTLE WITH SOLID SILICA FLAKY DRYING AGENT

TECHNICAL FIELD

The present invention relates generally to a medicine bottle having a solid silica flaky drying agent, in the technical field of pharmaceutical packaging.

BACKGROUND OF THE INVENTION

Medicine, as a kind of special merchandise related to human health, has special security requirements for every step of manufacturing, packaging, transportation and using, wherein the requirements for drying agent in packaging step are even more critical. The drying agent currently used in this industry is medicinal silica gel drying agent, using solid paper packaging or plastic vials packaging with numerous small holes. The silica gel is non-degradable, and has poor plasticity and, therefore, the packaging and bottling can not depart from human hand (the drying agent is first placed into a packaging bag or a bottle firstly, and then the packaged drying agent is put into a medicine bottle, requires two production processes). It is well known that, hand contact is likely to cause secondary pollution, and leave a small amount of crumb. The silica gel drying agent has a poor moisture absorption capacity, especially at 99% relative humidity. Its absorption saturation is reached only in 24 hours and the silica gel loses effectiveness.

In this regard, a Chinese utility model No. 200710094046.4, entitled "silicon oxide drying agent and the production method thereof" discloses a solid silica flaky drying agent comprising of 80-85% silicon oxide power and 15-20% starch. This product uses natural silica as raw material, which is non-toxic, odorless, and has a strong moisture absorption capacity; there is no change in color, no deliquescence and no pollution after moisture saturation. The significant advantages of this solid silica flaky drying agent, as compared with other drying agent, are: lasting moisture absorption effect, balanced moisture absorption rate, thus ensuring the quality of medicines. The compressive strength of the solid silica flaky drying agent is good, and there is no crumbling, no dust. Furthermore, the drying agent is sealed in a filter paper packaging, preventing a direct contact between the drying agent and the medicine, and greatly reducing the pollution source of dust particle and microbial contamination. However, due to the similar shape of the solid silica flaky drying agent and the medicine, putting the drying agent and the medicines together could easily lead to erroneously intake by senior citizens and children.

SUMMARY OF THE INVENTION

The present invention provides a medicine bottle with a solid silica flaky drying agent. Using the medicine bottle of the present invention can effectively prevent erroneous intake by senior citizens and children, and improve the safety in the use of medicine.

The present invention, by reducing the packaging link and making the packaging process in one step, enables the safety, effectiveness and homogeneity of the medicine. Compared with the existing pharmaceutical packaging technology (placing the drying agent into a packaging bag or a bottle, then putting the packaged drying agent into a medicine bottle, two production processes are required), the present invention reduces a production process, thus greatly increasing labor productivity and improving labor intensity and conditions.

The medicine bottle of the present invention includes a bottle cap in which a bottle cap screw thread is provided and a bottle body, a bottle body screw thread which can match with the bottle cap screw thread is provided on the outside of upper portion of the bottle body, the structural features are that: a circular bottle cap locking notch is provided between the bottle cap screw thread and the inner top end of the bottle cap, a bubble cap-type solid drying agent is installed between the circular bottle cap locking notch and the top of the bottle cap; or a circular bottle body locking notch is provided on the lower end of the bottle body, and a bubble cap-type solid drying agent is installed between the inner bottom end of the bottle body and the circular bottle body locking notch.

The bubble cap-type solid drying agent comprises a solid silica flaky drying agent, a tea filter paper, a bubble cap baseplate and a bubble cap, and moisture absorption openings from inside to outside; the moisture absorption openings penetrate the bubble cap, and the shape of the moisture absorption openings is circular or square, or triangular.

The number of the moisture absorption openings can be in the range of 1-8, each moisture absorption opening has a size of 1-50 mm.

The shape and size of the bubble cap are capable of wrapping the solid silica flaky drying agent provided with the tea filter paper inside.

The shape and size of the bubble cap baseplate are compatible with the shape and size of the inner top end of the bottle cap, while the thickness is consistent with the size of the gap between the inner top end of the bottle cap and the circular bottle cap locking notch, in order that the bubble cap-type solid drying agent is locked, so that it will not loose and fall off.

The shape and size of the bubble cap baseplate are compatible with the shape and size of the inner bottom end of the bottle body, while the thickness is consistent with the size of the gap between the inner bottom end of the bottle body and the circular bottle body locking notch, in order that the bubble cap-type solid drying agent is locked, so that it will not loose and fall off.

The solid silica flaky drying agent is a silicon oxide drying agent formed by 80-85% silicon oxide power and 15-20% starch by weight through mixing uniformly, sieving, pressing into tablets and drying.

The present invention includes the following advantages:

1. Because the medicine bottle of the present invention is configured such that the solid silica flaky drying agent is installed in the bottle cap or on the bottom end of the bottle body, and the solid silica flaky drying agent is fixed by the bottle cap ring-shaped locking notch or the bottle body ring-shaped locking notch, thus having an effect of being retained in the bottle, and will not be erroneously taken as medicine by the elderly or children.

2. The present invention uses a solid silica flaky drying agent, a filter paper, a bubble cap baseplate and a bubble cap to form a bubble cap type solid drying agent, and thus good drying effect can be guaranteed. In addition, the solid drying agent has better compressive strength, no crumbling, no dust, and the bubble cap prevents the direct contact between the drying agent and the medicine, and thus greatly reducing the potential danger of pollution source of dust particle and microbial contamination to the medicine.

3. The solid drying agent of the present invention is produced by using natural silica as a raw material, so it is non-toxic, odorless, and has a strong adsorption capacity as compared to the existing silica gel drying agent. It has the advantages of no change in color, no deliquescence and no reverse osmosis after moisture saturation, lasting moisture absorption effect and uniform moisture absorption rate, etc.

4. The present invention uses a method of creating moisture absorption openings on the bubble cap, ensuring the dryness of the medicines in the bottle, and the duration of drying lasts long, with the saturation time of absorption more than seven days at 99% relative humidity (the saturation time of absorption of the existing drying gel is only one day, 24 hours at 99% relative humidity), therefore providing a reliable guarantee for making the packaging process into one step, that is fully automated packaging.

5. The solid drying agent of the present invention is installed in the bottle cap or the bottom of the bottle by a circular cap locking notch, and it slow absorption (fully absorbing water by seven days at 99% relative humidity), as compared with the existing pharmaceutical packaging technology (place the drying agent into a packaging bag or a bottle, then put the packaged drying agent into a medicine bottle in two production processes), the present invention reduces the production processes, and greatly increases productivity and improves labor intensity and conditions, and, at the same time, ensures the medicine not being moist and ineffective.

In which:

| | |
|---|---|
| 1—bubble cap baseplate | 2—moisture absorption openings |
| 3—filter paper | 4—solid silica flaky drying agent |
| 5—bubble cap | 6—bottle cap |
| 7—circular cap locking notch | 8—bottle body screw thread |
| 9—bottle cap screw thread | 10—bottle body |
| 11—medicine; | 12—circular body locking notch. |

DETAILED DESCRIPTION OF THE INVENTION

Figure 1:
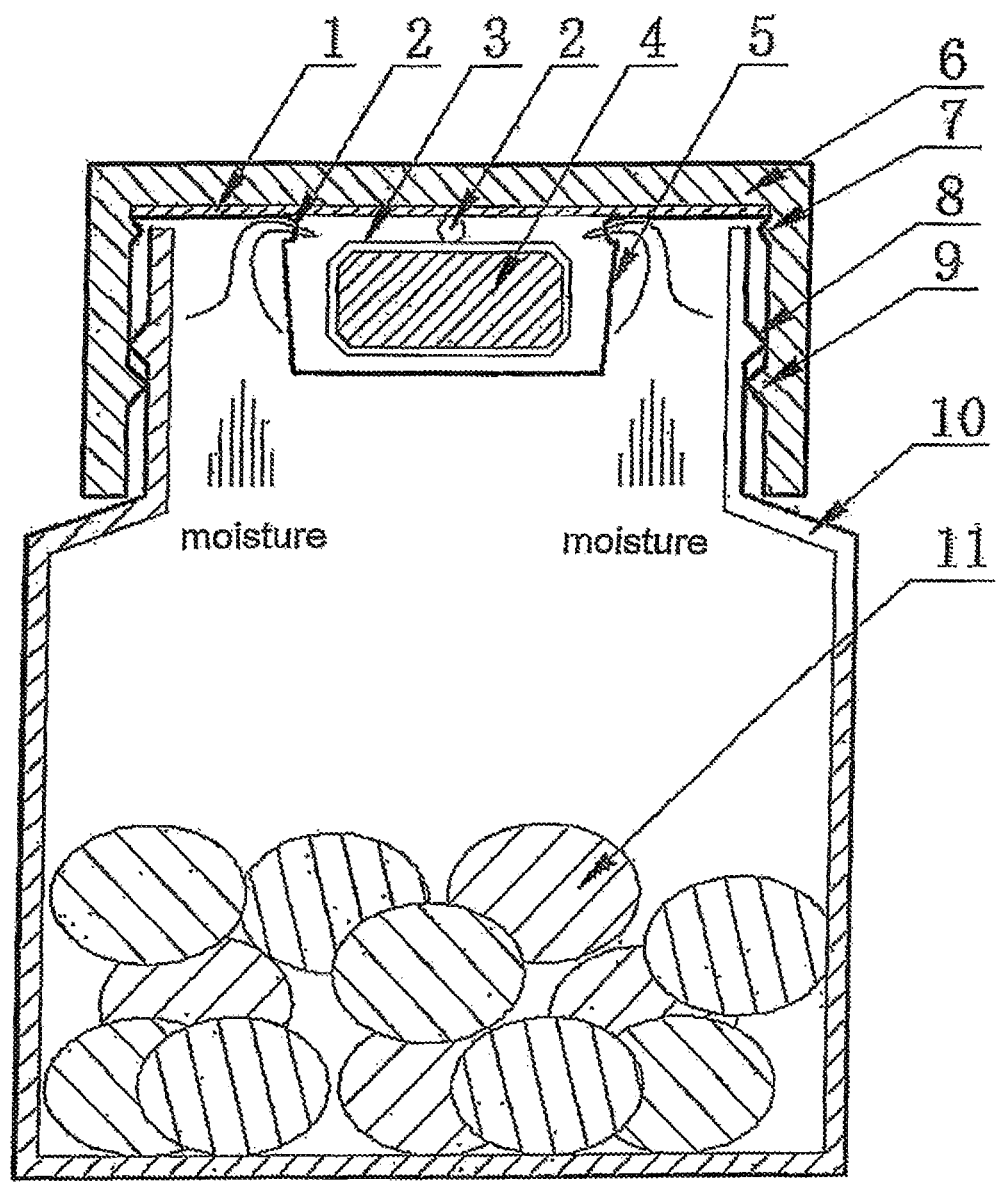
FIG. 1 is a schematic diagram of the structure of the medicine bottle with the drying agent placed in a bubble cap on the bottle cap, according to the present invention.
Figure 2:
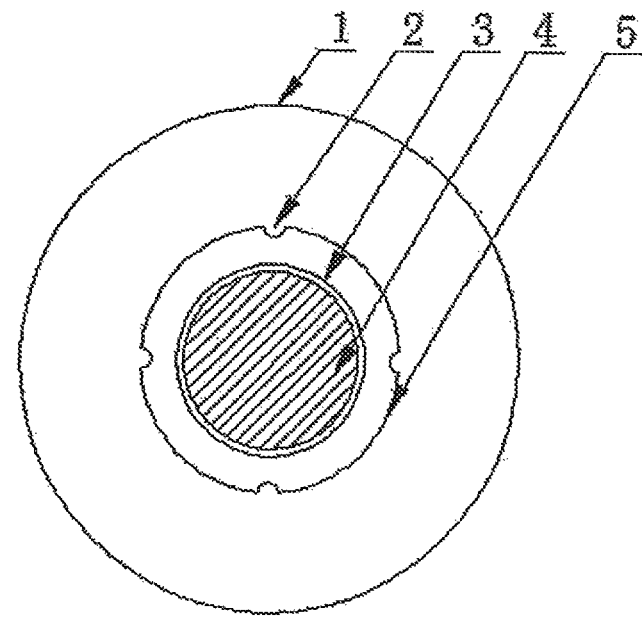
FIG. 2 is a bottom view of the bubble cap type drying agent of the present invention.
Figure 3:
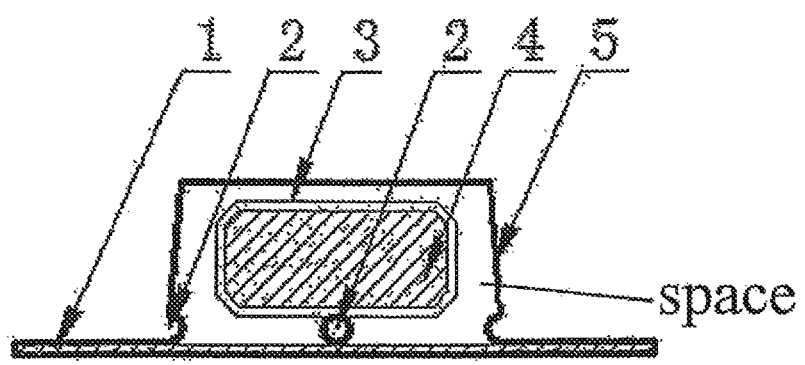
FIG. 3 is a cross sectional view of the bubble cap type drying agent of the present invention.
Figure 4:
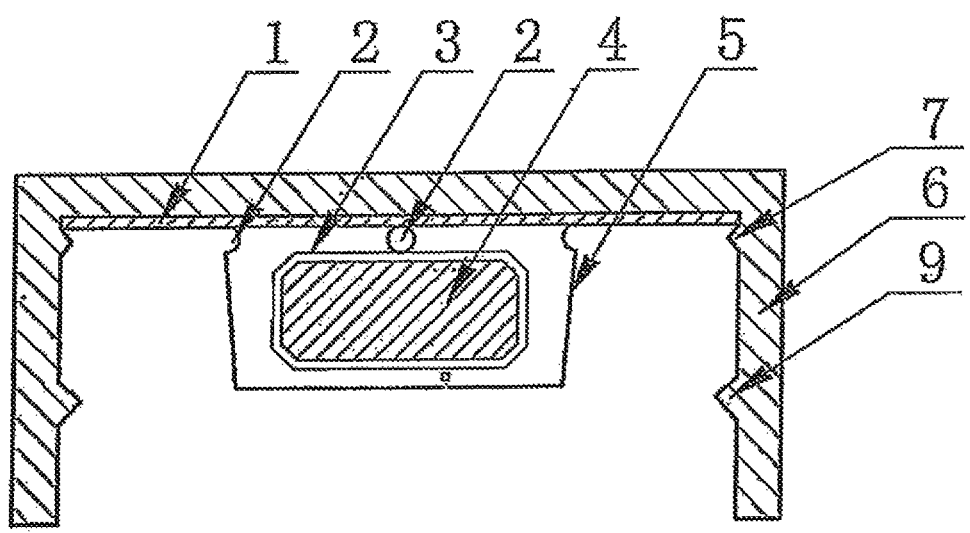
FIG. 4 is a schematic diagram of the structure of bottle cap having the bubble cap type drying agent of the present invention.
Figure 5:
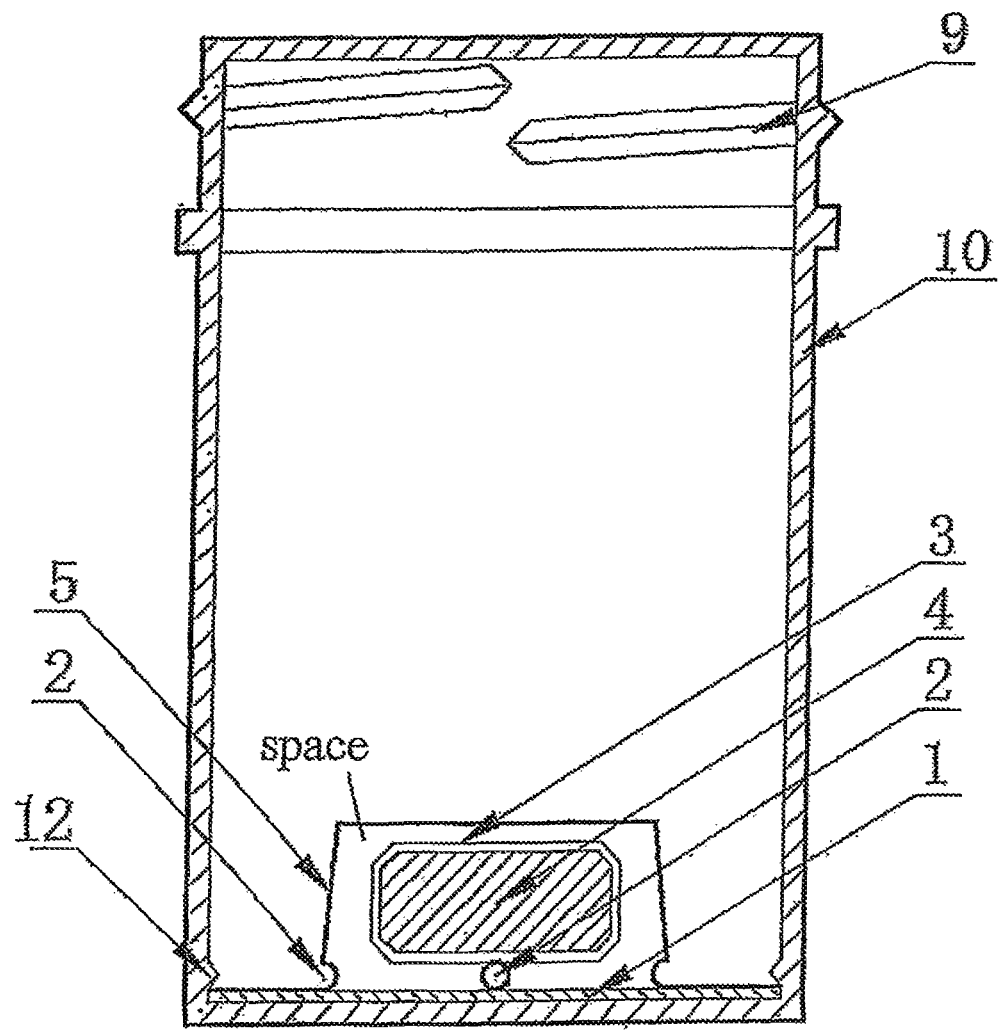
FIG. 5 is a schematic diagram of the structure of bottle body having the bubble cap type drying agent of the present invention.

Referring to FIGS. 1-5, based on the 5 ml to 5 l capacity of a circular or rectangular medicine bottle, estimate the amount of the solid silica flaky drying agent being 0.5-500 g. Then, in accordance with the content of Chinese patent application entitled "silicon oxide drying agent and the production method thereof", No. 200710094046.4, mix 80-100 g of commercially available silicon oxide power with silica sol in a weight ratio of 1:0.8-0.9 to obtain a mixture, and then mix the mixture with starch in a weight ratio of 4-4.25:0.75-1; add mold-release agents magnesium stearate containing the magnesium stearate in an amount of 0.5~1% of the total weight of the mixture. After screening the final mixture and compressing it into tablets, oven-drying the tablets and vacuum treatment, the solid silica flaky drying agent 4 is obtained.

The solid silica flaky drying agent 4 is wrapped with a tea filter paper 3, which is produced by Zhejiang Hangzhou Xinhua Paper Industry Co., Ltd. or Zhejiang Puruike Special Paper Co., Ltd. and meets the pharmaceutical use requirements with the specifications of 10-50 g/M2.

Then hot-press the solid silica flaky drying agent 4 wrapped by the tea filter paper 3 integral with the PE film by using a DPT-190 bubble packaging machine produced by Jinzhou Aluminum Plastic Machinery Co., Ltd, obtaining a bubble cap type solid drying agent. Specific pressing processes are as follows: press-form the PE film that is used to make the bubble cap in accordance with the hot-pressing temperature of PE to obtain bubble cap 5; perforate four symmetric moisture absorption openings around the circumference of the bubble cap 5; put the solid silica flaky drying agent 4 wrapped by the tea filter paper 3 into the space in bubble cap 5; thereafter, cover the bubble cap 5 with bubble cap baseplate 1 for heat-sealing and pressing to obtain the bubble cap type solid drying agent.

The bubble cap baseplate 1 is a medical paper-plastic PE baseplate produced by Shanghai Yate Yingyi Packaging Material Co., Ltd. The shape and size of the bubble cap baseplate 1 is compatible with the shape and size of the inner top end of the bottle cap, while the thickness is consistent with the size of the gap between the inner bottom end of the bottle body and the circular bottle body locking notch (12) or compatible with the shape and size of the inner bottom end of the bottle body. The shape and size of the bubble cap baseplate 1 is compatible with the shape and size of the inner bottom end of the bottle body 10, while the thickness is consistent with the size of the gap between the inner bottom end of the bottle body and the circular bottle body locking notch (12).

The bubble cap 5 uses a PE film with the thickness specification of 100-500 μm produced by Hunan Qiyang New Wuzhou Packaging Co., Ltd. Firstly, opening four equidistant moisture absorption openings 2 in the connection of bubble cap 5 and bubble cap baseplate 1 with the size of the moisture absorption openings 2 being selected in the range of 1-50 mm depending on the size specification of the medicine bottle.

In addition, adding a circular locking notch to the structure of bottle cap 6 and bottle body 9 in order to fulfill the requirement for mounting the bubble cap-type solid drying agent.

Specific processes are as follows:

The method of adding the circular bottle cap locking notch 7 to the bottle cap 6 is as follows: a circular projection is provided between the bottle cap screw thread 9 and the inner top end of the bottle cap 6, forming the circular bottle cap locking notch 7, the bubble cap-type solid drying agent is installed between the circular bottle cap locking notch 7 and the top of the bottle cap 6, so that the bubble cap-type solid drying agent will not fall off because of the circular bottle cap locking notch 7. Finally, the bottle cap 6 installed with the bubble cap-type solid drying agent, after sealing, is sent to a pharmaceutical packaging workshop for packaging the pharmaceuticals.

It should be noted that the bottle body 10 has a circular projection which is used as the circular bottle body locking notch 12, and the bubble cap-type solid drying agent is installed between the inner bottom end of the bottle body 10 and the circular bottle body locking notch 12. The bubble cap-type solid drying agent will not fall off because of the blocking of the circular bottle body locking notch 12. Finally, the bottle body 10 installed with the bubble cap-type solid drying agent, after sealing, is sent to a pharmaceutical packaging workshop for packaging the pharmaceuticals.

What is claimed is:

1. A medicine bottle having a bottle cap and a bottle body, the bottle body having an open bottle top, a bottle bottom and a side wall connected to the bottle bottom, the bottle top dimensioned to receive the bottle cap, the bottle bottom having an inner bottom surface, the side wall having an inner wall surface connected to the inner bottom surface, said medicine bottle comprising:
    a notch structure provided inside the medicine bottle on the bottle body, and
    an added-on bubble cap-type solid drying agent, the bubble cap-type solid drying agent comprising a bubble cap made of a polymer film, the bubble cap having a circumference, a rim portion and one or more openings made on the bubble cap around the circumference, a solid silica flaky drying agent wrapped in filter paper and placed inside the bubble cap, and a base plate heat-sealed onto the rim portion of the bubble cap, the base plate having a thickness, wherein the notch structure is a ring-shaped circular notch made on the side wall surface adjacent to but spaced from the inner bottom surface, forming a gap between the circular notch and the inner bottom surface of the bottle bottom, the gap consistent with the thickness of the base plate, and wherein the circular notch is wider than the circumference of the bubble cap but narrower than the base plate such that the base plate is inserted into the gap between the circular notch and the inner bottom surface of the bottle bottom with the bubble cap facing the bottle top such that the base plate is positioned between the bubble cap and the inner bottom surface and that the base plate is adjacent to both the circular notch and the inner bottom surface of the bottle bottom for preventing the bubble cap-type solid drying agent from separating from the bottle body.

2. The medicine bottle according to claim 1, wherein the bubble cap has a top surface spaced from the base plate to provide a space for enclosing the solid silica flaky drying agent wrapped in the filter paper and wherein the one or more openings comprises a plurality of openings made through the bubble cap around the circumference.

3. The medicine bottle according to claim 1, wherein the bottle cap comprises bottle cap screw thread and the bottle body comprises bottle body screw thread dimensioned to engage with the bottle screw thread.

4. The medicine bottle according to claim 1, wherein the base plate is made of a paper-plastic plate for heat sealing onto the rim portion of the bubble cap.

5. The medicine bottle according to claim 1, wherein the polymer film comprises a polyester film.

6. The medicine bottle according to claim 5, wherein the polyester film has a thickness between 100-500 microns.

7. The medicine bottle according to claim 1, wherein the solid silica flaky drying agent comprises a raw, natural silica material.

8. The medicine bottle according to claim 1, wherein the solid silica flaky drying agent is made from a first mixture of silicon oxide powder and silica sol in a weight ratio of 1:0.8-0.9; and a second mixture of magnesium stearate added to the first mixture in an amount of 0.5-1% of a total weight of the second mixture.

9. The medicine bottle according to claim 8, wherein the second mixture is screened and then pressed into tablets, the tablets further processed by oven-drying and vacuum treatment.

10. The medicine bottle according to claim 2, wherein the top surface of the bubble cap is spaced from the circular notch such that the gap between the circular notch and the inner bottom surface is smaller than a distance between the top surface of the bubble cap and the base plate.

\* \* \* \* \*